US011507546B2

(12) United States Patent
Krivenok (10) Patent No.: US 11,507,546 B2
(45) Date of Patent: Nov. 22, 2022

(54) MANAGEMENT NETWORK ORGANIZATION APPROACH FOR CLUSTERED AND FEDERATED STORAGE SYSTEMS

(71) Applicant: EMC IP Holding Company, LLC, Hopkinton, MA (US)

(72) Inventor: Dmitry Vladimirovich Krivenok, St Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 393 days.

(21) Appl. No.: 16/595,946

(22) Filed: Oct. 8, 2019

(65) Prior Publication Data

US 2020/0250153 A1 Aug. 6, 2020

(51) Int. Cl.
*H04L 12/00* (2006.01)
*G06F 16/21* (2019.01)
*G06F 16/25* (2019.01)
*G06F 3/06* (2006.01)
*H04L 41/0813* (2022.01)

(52) U.S. Cl.
CPC ............ *G06F 16/211* (2019.01); *G06F 3/067* (2013.01); *G06F 16/214* (2019.01); *G06F 16/256* (2019.01); *H04L 41/0813* (2013.01)

(58) Field of Classification Search
CPC .................................................. G06F 16/256

USPC ........................................................ 709/221
See application file for complete search history.

(56) References Cited

U.S. PATENT DOCUMENTS

| 9,407,557 | B2* | 8/2016 | Wadkins | H04L 41/0895 |
|---|---|---|---|---|
| 10,380,369 | B1* | 8/2019 | Noe | G06F 21/604 |
| 2007/0233700 | A1* | 10/2007 | Tomonaga | G06F 3/067 |
| 2008/0270701 | A1* | 10/2008 | Fujimoto | G06F 12/0813 |
| | | | | 711/119 |
| 2016/0301667 | A1* | 10/2016 | Hyun | H04L 63/0272 |
| 2019/0394266 | A1* | 12/2019 | Fukuyama | H04L 67/1097 |
| 2020/0125454 | A1* | 4/2020 | Naidu | H04L 63/126 |

* cited by examiner

*Primary Examiner* — Frantz Coby
(74) *Attorney, Agent, or Firm* — Brian J. Colandreo; Mark H. Whittenberger; Holland & Knight LLP (57) ABSTRACT

A method, computer program product, and computing system for use in a clustered storage system are provided. Embodiments may include providing, using a management network, one or more of external access to the clustered storage system, management of intra-cluster traffic, management of hypervisor traffic, and access to infrastructure services. Embodiments may further include allowing, using a storage network, access to the clustered storage system from within the clustered storage system and one or more external hosts. Embodiments may also include providing a migration network to allow for mobility of one or more virtual machines within clustered storage system. Embodiments may further include splitting the management network into a public management network and an internal intra-cluster management network.

20 Claims, 4 Drawing Sheets

FIG. 4

MANAGEMENT NETWORK ORGANIZATION APPROACH FOR CLUSTERED AND FEDERATED STORAGE SYSTEMS

RELATED APPLICATIONS

This application claims priority from Russian Patent Application Number 2019102666, filed on 31 Jan. 2019, at the Patent Office of the Russian Federation, Russia, entitled "MANAGEMENT NETWORK ORGANIZATION APPROACH FOR CLUSTERED AND FEDERATED STORAGE SYSTEMS," the entire contents of which are hereby incorporated by reference.

TECHNICAL FIELD

This disclosure relates to storage management systems and, more particularly, to systems and methods for managing clustered and federated storage systems.

BACKGROUND

Storing and safeguarding electronic content is of paramount importance in modern business. Accordingly, various methodologies may be employed to protect and distribute such electronic content within storage management systems. Existing clustered and federated storage systems using Ethernet network technology usually have one or more customer-provided internet protocol ("IP") networks which span across all nodes of the cluster. Due to sharing the public cluster management between multiple traffic types (usecases), both requiring public access and inherently internal to the cluster, automatic and non-disruptive reconfiguration of the management network becomes very problematic.

This may be due to the fact that when IP addresses on cluster nodes get changed and/or are moved to a different virtual local area network ("VLAN"), the internal cluster connectivity is disrupted which makes it hard or even impossible to orchestrate the changes on the entire storage cluster.

Change of the management network usually requires bringing the entire cluster down and running some service scripts on each node of the cluster. That process is manual and error-prone, especially for heterogeneous and/or hyper-converged infrastructure ("HCI") clusters where multiple coordinated changes need to be made on the storage controllers, hypervisors and external virtualization managers.

SUMMARY OF DISCLOSURE

In one implementation, a computer-implemented method for use in a clustered storage system is provided. The method may include providing, using a management network, one or more of external access to the clustered storage system, management of intra-cluster traffic, management of hypervisor traffic, and access to infrastructure services. The method may further include allowing, using a storage network, access to the clustered storage system from within the clustered storage system and one or more external hosts. The method may also include providing a migration network to allow for mobility of one or more virtual machines within clustered storage system. The method may further include splitting the management network into a public management network and an internal intra-cluster management network.

One or more of the following features may be included. The method may include automatically configuring the internal intra-cluster management network without user input. Automatically configuring may be based upon, at least in part, one or more IPv6 unique local addresses ("ULAs"). If there is at least one failing node, the method may also include allowing cluster-wide network reconfiguration of the clustered storage system. Cluster-wide network reconfiguration may be performed without having all nodes of the clustered storage system running. The clustered storage system may include a hyper-converged infrastructure ("HCI") cluster. The one or more ULAs may be used to eliminate storage stack component editing.

In another implementation, a computer program product resides on a computer readable medium and has a plurality of instructions stored on it. When executed by a processor, the instructions cause the processor to perform operations including providing, using a management network, one or more of external access to the clustered storage system, management of intra-cluster traffic, management of hypervisor traffic, and access to infrastructure services. Operations may further include allowing, using a storage network, access to the clustered storage system from within the clustered storage system and one or more external hosts. Operations may also include providing a migration network to allow for mobility of one or more virtual machines within clustered storage system. Operations may further include splitting the management network into a public management network and an internal intra-cluster management network.

One or more of the following features may be included. Operations may include automatically configuring the internal intra-cluster management network without user input. Automatically configuring may be based upon, at least in part, one or more unique local addresses ("ULAs"). If there is at least one failing node, operations may also include allowing cluster-wide network reconfiguration of the clustered storage system. Cluster-wide network reconfiguration may be performed without having all nodes of the clustered storage system running. The clustered storage system may include a hyper-converged infrastructure ("HCI") cluster. The one or more ULAs may be used to eliminate storage stack component editing.

In another implementation, a computing system includes a processor and memory for use in a clustered storage system configured to perform operations including providing, using a management network, one or more of external access to the clustered storage system, management of intra-cluster traffic, management of hypervisor traffic, and access to infrastructure services. Operations may further include allowing, using a storage network, access to the clustered storage system from within the clustered storage system and one or more external hosts. Operations may also include providing a migration network to allow for mobility of one or more virtual machines within clustered storage system. Operations may further include splitting the management network into a public management network and an internal intra-cluster management network.

One or more of the following features may be included. Operations may include automatically configuring the internal intra-cluster management network without user input. Automatically configuring may be based upon, at least in part, one or more unique local addresses ("ULAs"). If there is at least one failing node, operations may also include allowing cluster-wide network reconfiguration of the clustered storage system. Cluster-wide network reconfiguration may be performed without having all nodes of the clustered storage system running. The clustered storage system may include a hyper-converged infrastructure ("HCI") cluster. The one or more ULAs may be used to eliminate storage stack component editing.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Embodiments of the present disclosure are directed towards a management network organization approach for clustered and federated storage systems. In some embodiments, the teachings of the present disclosure introduces a new method of management network organization for clustered and federated storage systems. Embodiments of network organization process may be configured to split a cluster management network into independent public and internal networks. The process may also include reorganization of the storage software stack so that all internal intra-cluster traffic is moved to the internal network.

Accordingly, embodiments of network organization process may provide a stable and reliable cluster network that reliably and non-disruptively allows for numerous network reconfiguration activities in the cluster without compromising cluster consistency and introducing the risk of network partitions. Embodiments may be used in accordance with both homogeneous and heterogeneous clusters including HCI systems where network management may be split between the hypervisors and storage controllers. Embodiments included herein may also introduce a fully automatic internal network addressing scheme with practically close to zero probability of collisions.

Figure 1:
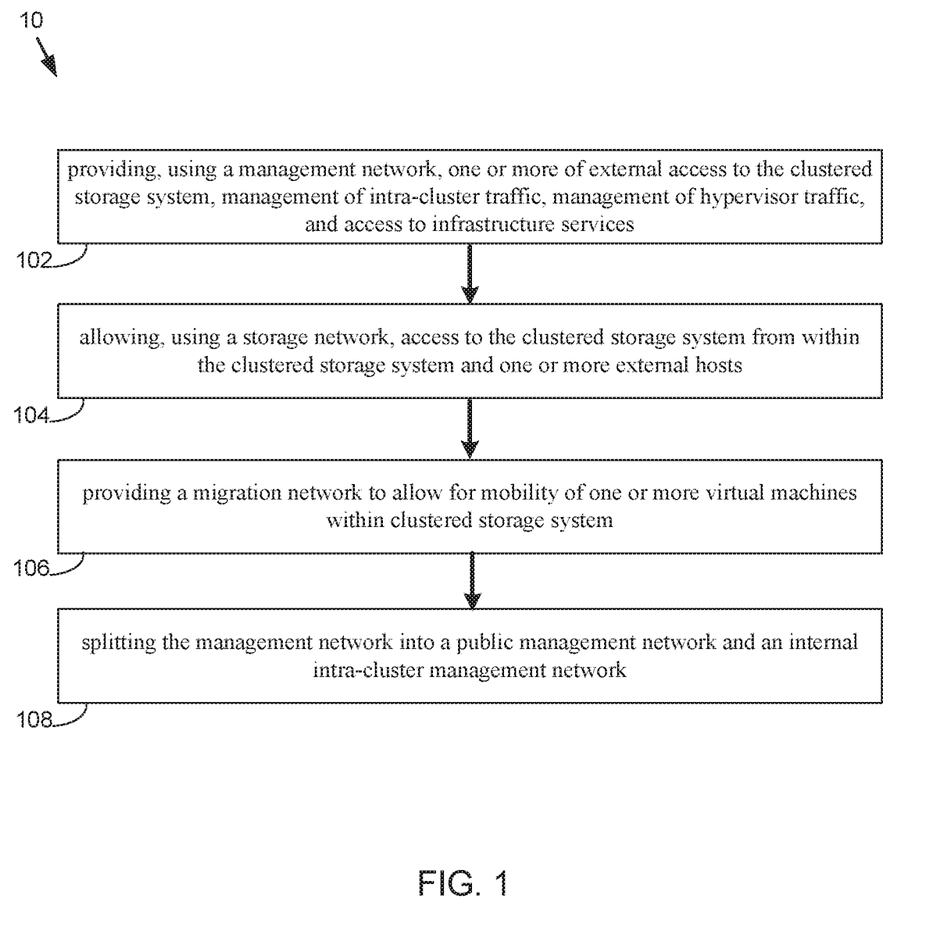
FIG. 1 is a flowchart of one implementation of the network organization process.

Referring now to FIG. 1, a flowchart depicting examples of operations that may be used in accordance with network organization process 10 are provided. Operations may include providing (102), using a management network, one or more of external access to the clustered storage system, management of intra-cluster traffic, management of hypervisor traffic, and access to infrastructure services. Operations may further include allowing (104), using a storage network, access to the clustered storage system from within the clustered storage system and one or more external hosts. Operations may also include providing (106) a migration network to allow for mobility of one or more virtual machines within clustered storage system. Operations may further include splitting (108) the management network into a public management network and an internal intra-cluster management network.

Figure 2:
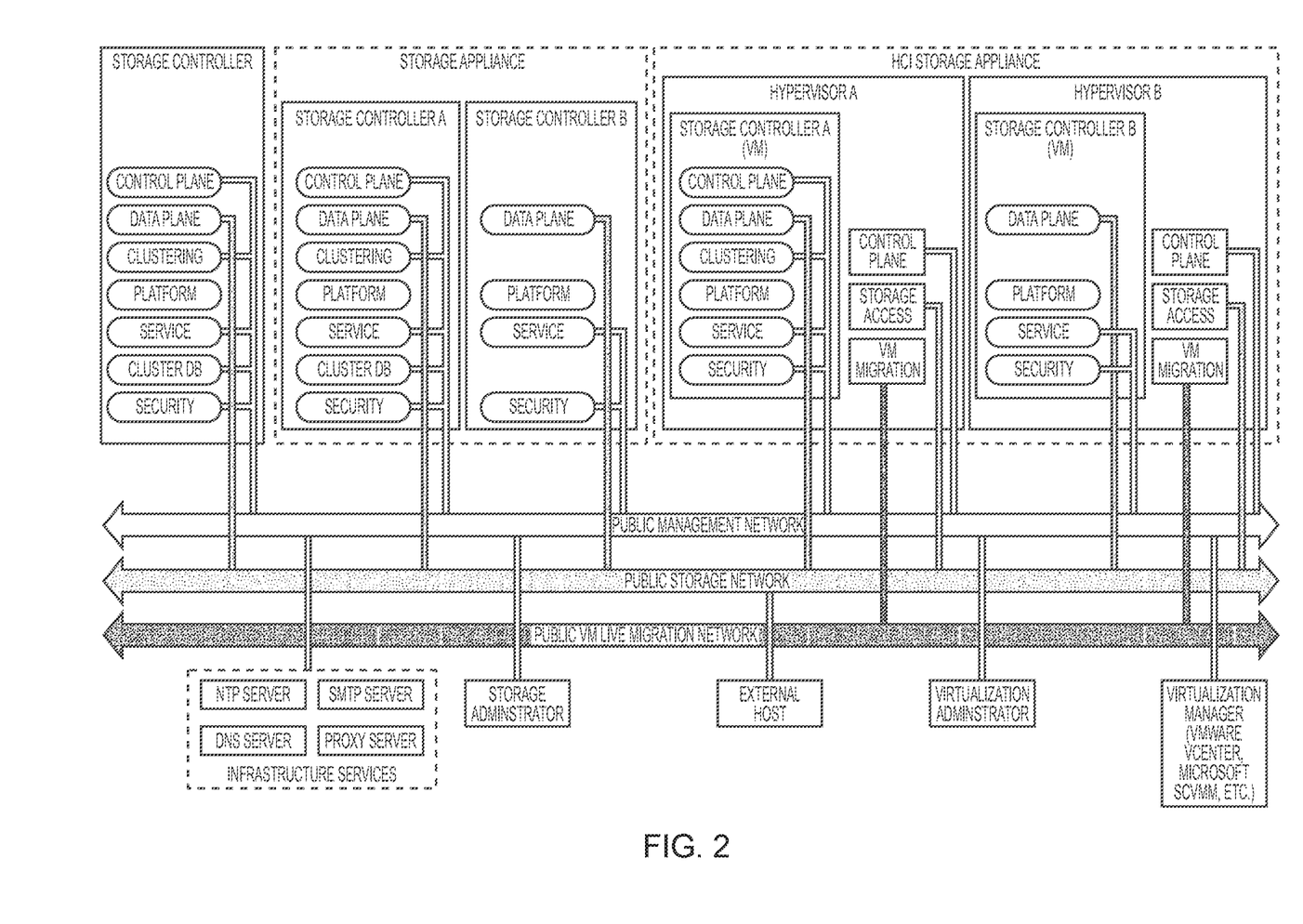
FIG. 2 is a diagrammatic view of an embodiment illustrating an example of a heterogeneous clustered storage system that may be used in accordance with network organization process.

Referring now to FIG. 2, an embodiment illustrating an example of a heterogeneous clustered storage system is provided. In this example, the system may include one storage-only highly-available appliance, one HCI storage appliance and one storage controller (e.g., physical or virtual). That storage system may be presented to the end user as a single storage cluster with a single point of management.

In some embodiments, from a networking point of view, such storage clusters may be implemented very differently, but almost all of them have at least three cluster-wide networks that may be either dedicated networks or just a network overlay on top of common physical networking infrastructure. Some of these cluster—wide networks may include, but are not limited to, a management network for external access to the storage system, intra-cluster management traffic, hypervisor management traffic, access to the infrastructure services, etc., a storage network for access to the storage from within the cluster and from the external hosts, and a virtualization manager ("VM") live migration network for mobility of virtual machines within the HCI cluster, etc.

In some embodiments, each network may represent a pool of IP addresses to be assigned to the cluster nodes, common network prefix and, optionally, gateway and VLAN ID. Some or all network parameters may be specific to the target network environment and may be supplied by the user during cluster initial configuration.

In some embodiments, the storage system may require access to one or more external infrastructure services like domain name system ("DNS") and network time protocol ("NTP") servers and, in the example of HCI or heterogeneous clusters, to the external virtualization manager (e.g., VMware vCenter, Microsoft SCVMM, etc.). It is often desirable to minimize the number of networks and IP addresses within each network due to administrative and technical reasons. The downside of this design decision is that a single network is being used for very different use-cases. It is especially critical for the management network which is being used for the use-cases requiring the external access and use-cases inherently internal to the storage cluster. The diagram shown in FIG. 3 demonstrates different types of use-cases.

Figure 3:
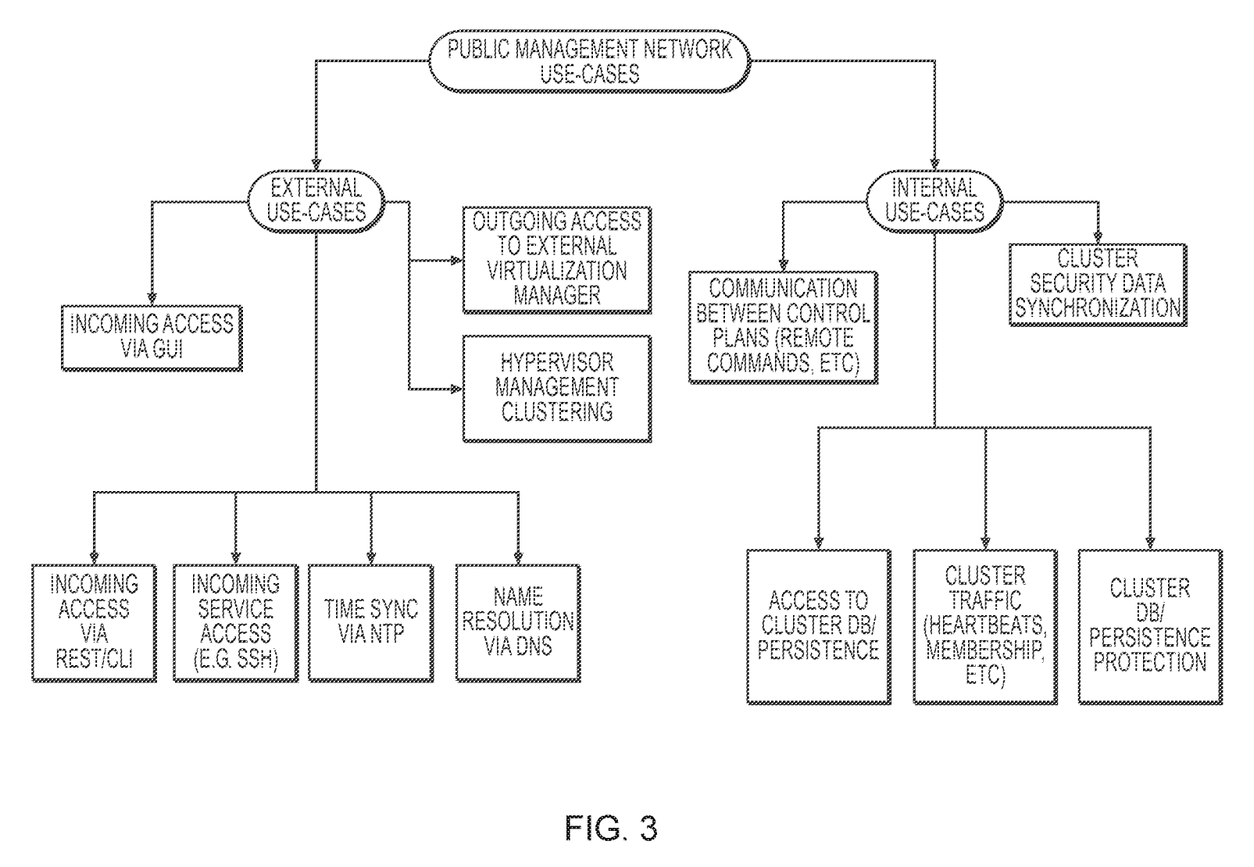
FIG. 3 is a diagrammatic view indicating a number of public management use-cases for use with network organization process.

In some embodiments, the group of external use-cases may be inherently tied to the public (usually routable) management network. The group of internal use-cases, however, may be inherently limited to the scope of the storage cluster and may not need to use the public management network at all. Sharing of a single management network between those use-cases has a significant drawback as it may be extremely difficult (if possible at all) to orchestrate non-disruptive reconfiguration of the management network without compromising the internal cluster consistency.

Network reconfiguration scenarios may vary in scope, some examples may include, but are not limited to, change of a single IP address on one cluster node, change of several IP addresses on multiple cluster nodes, change of a gateway or network prefix on all cluster nodes, change of the VLAN on all cluster nodes, change of the VLAN and the entire subnet (all IPs, network prefix, gateway) on all cluster nodes, etc. Orchestration of the management network reconfiguration may be very problematic for such storage systems. This may be as a result of internal clustering works via the public management network, so if it is altered, it may introduce network partitions. Moreover, orchestration of the reconfiguration in the clustered system may require the exchange of commands between nodes of the cluster. This exchange may occur via the public management network, so if it is changed on one node, communication between it and other nodes may not be possible. Orchestration may be also be problematic since on HCI or heterogeneous storage clusters, part of the management network configuration may be implemented on the virtualization manager. For example, with a VMware Virtual Distributed Switch (vDS) design, the VLAN ID may be configured on the port group of the vDS. If it is changed there, it may disrupt the cluster connectivity at least between HCI and non-HCI nodes of the cluster. As can be seen from the above, the fundamental issue involves orchestrating the reconfiguration of the management network by communicating via the same network.

Figure 4:
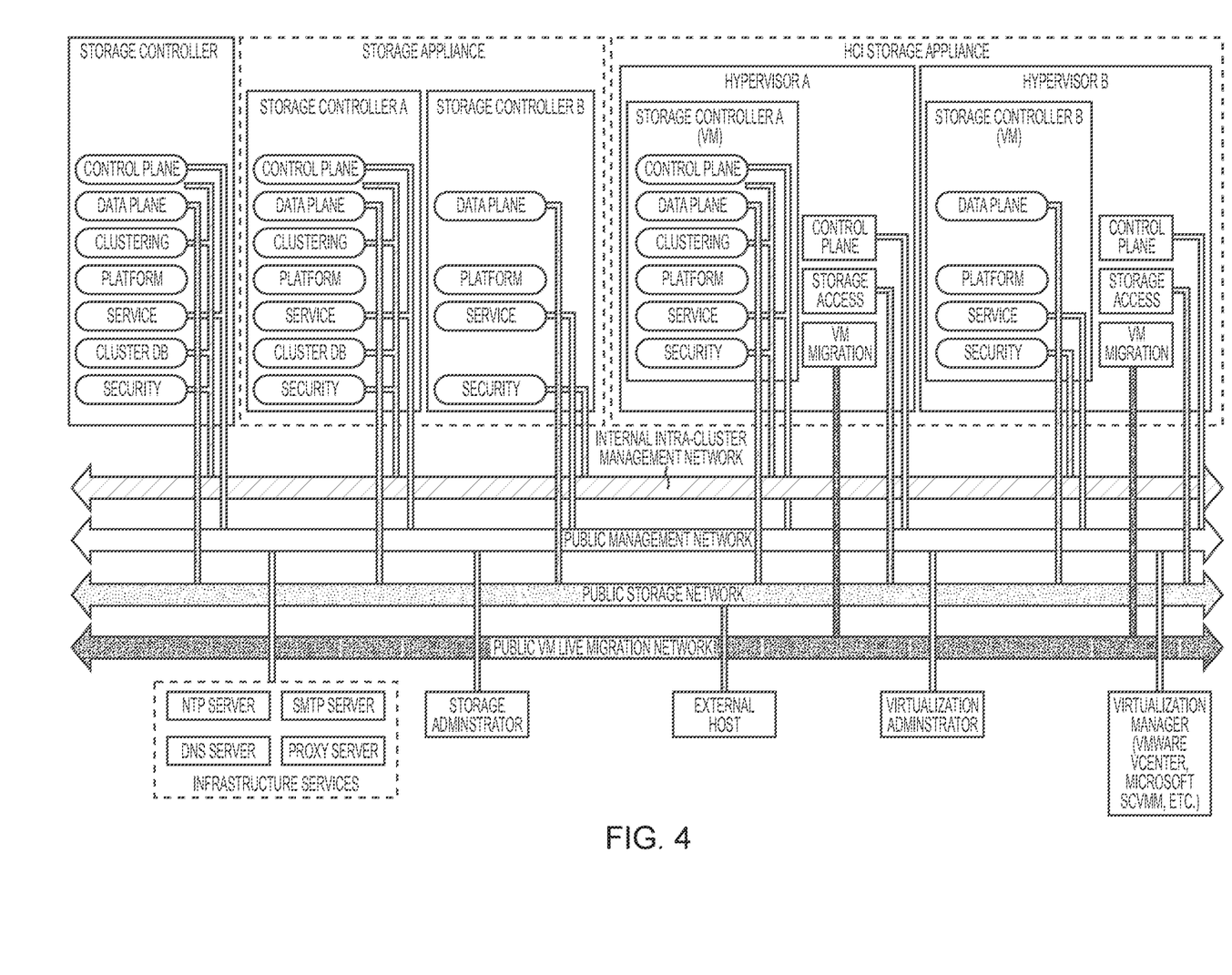
FIG. 4 is a diagrammatic view of an embodiment illustrating an example of a heterogeneous clustered storage system that may be used in accordance with network organization process.

Referring now to FIG. 4, embodiments of network organization process 10 are provided. As is discussed in further detail below, embodiments may include splitting the management network into two (or more) independent networks. These may include a public management network (may only be used for the external use-cases like incoming connections via graphical user interface ("GUI"), command line interface ("CLI") or representational state transfer ("REST") application programming interface ("API"), outgoing connections to the infrastructure services, etc.) and an internal intra-cluster management ("ICM") network (may be used for all use-cases inherently internal to the storage cluster, e.g. remote commands execution, access to cluster database ("DB") or other cluster persistence mechanism, clustering traffic like heartbeats, etc.).

As shown in FIG. 4, a clustered storage system including the split ICM network is provided. The public management network may continue to be customer provided and remain fully reconfigurable. The ICM network, in turn, may act as a static and non-reconfigurable network by means of the storage system control plane. Accordingly, the ICM network may provide a reliable intra-cluster communication channel that may be used to orchestrate non-disruptive reconfiguration of any public cluster-wide network including the management network.

Even though the storage system software stack should be changed once to adopt an ICM based design, this approach may actually provide a much easier software model because the components do not need to analyze the full replacement of the IP network during normal operation of the storage system. As such, the ICM network may remain unchanged from the initial deployment of the storage system.

In some embodiments, network organization process 10 may include automatically generating an ICM network. In some cases, this may be based on one or more IPV6 unique local addresses (ULA) addresses. One of the reasons that a single public management network is often used for all use-cases is that it is not desirable to require multiple customer-provided subnets and, optionally, VLANs. The ICM network may be limited to a single Layer 2 broadcast domain and may not need to be routable. This mechanism suggests using IPv6 unique local addresses (ULA) to automatically generate the ICM network instead of asking the end user to provide network information.

ULAs may use reserved prefix fc00::/7 and the diagram below shows how ULAs are structured. The "L" bit must be set to 1 to indicate that IP address is locally assigned.

| Diagram 1 | | | | |
|---|---|---|---|---|
| 7 bits Prefix | 1 L | 40 bits Global ID | 16 bits Subnet ID | 64 bits Interface ID |

According to Request for Comments ("RFC") 4291, for unicast IPs, the interface ID may be 64 bits long and may be based on modified EUI-64 format (mEUI-64). The first part of the process may generate the EUI-64. This may include an official 24-bit organizationally unique identifier ("OUI") value registered for the storage system vendor (http://standardsoui.ieee.org/oui.txt). This value may occupy the first 24 bits. The remaining 40 bits may be generated based on some unique stable values available for the storage appliance or storage controller in the storage cluster.

In some embodiments, it may be possible to generate the remaining 40 bits of EUI-64 using the following approach. The process may obtain the current time in 64-bit NTP format defined in RFC 1305 (denoted as T). This time format may be required later for ULA Global ID generation, so it may be reused for the EUI-64 generation as well. The process may obtain the storage appliance serial number or another unique identifier (denoted as S) and obtain the storage system-specific purpose as follows (denoted as P). For example, a dual-controller storage appliance may use the following purposes for the ICM addresses: "A" for node A ICM IP, "B" for node B ICM IP, and "F" for appliance floating ICM IP. The process may involve calculating 160 bit SHA-1 of concatenated T+S+P and using the least significant 40 bits of SHA-1 as the second part of EUI-64.

Once EUI-64 is generated, the final step to generate the interface ID may include inverting universal/local bit (the second least significant bit of the first byte of EUI-64) to translate it to the mEUI-64 format as shown in diagram 2 shown below.

| Diagram 2 | | | | |
|---|---|---|---|---|
| 0 0 | 1 1 5 6 | 3 3 1 2 | 4 4 7 8 | 6 3 |
| cccccc\|gcccccccc | ccccccccmmmmmmm mm | mmmmmmmmmmmmmm mmmm | mmmmmmmmmmmmmmmm mm | |

The Global ID may be generated according to RFC 4193 rules. This may include obtaining the current time in 64-bit NTP format (denoted as T), obtaining the EUI-64 identifier (denoted as E), calculating 160 bit SHA-1 of concatenated T+E, and using the least significant 40 bits of SHA-1 as the Global ID. It is possible to re-use one of the EUI-64 values generated at the previous step during Interface ID generation or create a new value using the same algorithm. The Subnet ID may be set to all zeros because only a single subnet within the globally unique prefix may be needed for ICM network.

In some embodiments, each storage cluster may have exactly one ICM network and this algorithm may generate one IPv6 subnet out of 2^40 possible variants (2^56 if we consider non-zero Subnet ID). Within each ICM network, embodiments included herein may generate a number of IP addresses. The exact number may be specific to each storage cluster, but the number of required addresses is usually a function of the number of nodes in the storage cluster. Addresses may be generated pseudo-randomly and, because globally unique OUI values may be used, we have 2^40 for each OUI. Note, that the storage vendor may have more than one reserved OUI. This provides close to zero probability of collisions in practice.

Using this approach, the ICM network may be generated in an entirely automatic fashion. The ICM network Global ID may be generated only once and never changes. Each ICM IP address may be generated once and may be persisted in some stable storage available on the storage appliance. Even if some hardware components may be replaced on the storage system (e.g. network interface controller ("NIC") or entire controller), ICM IP addresses must never be regenerated, even if stable values used to originally generate them were derived from replaced hardware.

Some of the particular examples discussed herein are based on IPv6 addresses. Since the ICM network is completely internal to the storage cluster, there should not be any issues with using IPv6 addresses. However, ICM network traffic is visible on the physical network. Even though it may be restricted to one Layer 2 broadcast domain and is not routable, in very rare cases some environments may block all IPv6 traffic. Accordingly, embodiments included herein may design the ICM network so that it may be IP version agnostic. Unlike IPv6, there is no way to generate an IPv4 subnet with the same guarantees about the probability of collisions. This may mean that storage clusters should support a fallback option that may allow customers to provide an IPv4 subnet to be used for ICM network in the storage cluster. The same restrictions about lack of reconfiguration support apply for this option.

Even though the probability of address conflicts is extremely low, in theory, the conflicts may happen. If a conflict occurs during the generation of the ICM addresses, then it may be caught via an IPv6 duplicate address detection ("DAD") mechanism and a new Global ID may be generated. If the conflict occurs later, e.g., when two or more broadcast domains are merged, then the storage system must be able to report that.

An important aspect of ICM network design is that it's not supposed to be reconfigurable. This basically means that ICM network must either be in the native VLAN or should use the VLAN which never changes. Keeping ICM network traffic untagged is the easiest option which works well in practice. If usage of the dedicated VLAN is strictly required, then embodiments included herein will work until there is a need to change it.

For the resolving the address conflicts and changing of the non-native VLAN, it may be necessary to take the storage cluster down. The storage system may be architected so that it may be possible to obtain write access to the persistence storage when components of the storage stack are down. In some embodiments, the recovery procedure may include determining if there was an ICM IPv6 address conflict and, if so, generating a new Global ID and updating all ICM addresses already allocated (note that an address conflict may happen only if Global ID is already not unique, so changing only the Interface ID may not be enough). If a dedicated VLAN needs to be changed, then it should be updated. At this point, all nodes of the cluster may be booted as they normally would.

Embodiments of the present disclosure provide numerous advantages over existing approaches. For example, network organization process 10 may provide a stable and reliable ICM network that allows for reliably and non-disruptively performing numerous network reconfiguration activities in the cluster without compromising cluster consistency and introducing the risk of network partitions. Network organization process 10 may allow the public management network to be reconfigured without taking the cluster down, hence avoiding downtime and planning of the maintenance window. Network organization process 10 may also allow for reconfiguring the storage cluster some nodes of which are down (e.g. due to hardware failures). There is no need to defer cluster-wide network reconfiguration until the entire, potentially very large, storage cluster is fully healthy. Recovered cluster nodes may synchronize public network configuration from the cluster persistence via the ICM network and make necessary local changes. Network organization process 10 may be used with both homogeneous and heterogeneous clusters including HCI systems where network management may be split between the hypervisors and storage controllers. Network organization process 10 introduces a fully automatic internal network addressing scheme with nearly no probability of collisions. Embodiments included herein may simplify security configuration in the storage cluster. For example, firewall and internet protocol security ("IPsec") configuration may be based only on the ICM network prefix. Moreover, it may reduce the attack surface because storage components using the ICM network are no longer reachable via (usually routable) public management network. Network organization process 10 may also be used on top of an existing network infrastructure and does not require a dedicated physical network (can be implemented as a network overlay). Embodiments included herein may allow for the use of larger maximum transmission unit ("MTU") to optimize some intra-cluster traffic flows (e.g. cluster persistence sync) without impacting MTU settings of the public management network. Unlike link-local IPv4 and IPv6 addresses, the IPv6 ULA addresses described herein may not require any special handling in the storage stack components (e.g. need to handle sudden changes of IPv4 link-local addresses due to conflicts or per-link semantics). This significantly simplifies transition of the storage stack components to the ICM network. Embodiments included herein may minimize the number of public IP addresses required by the storage cluster. For example, if each node used many IP addresses from the public management network for different purposes, then some of them may be reclaimed if ICM network can be used for those purposes. Network organization process 10 may also simplify the embedding of existing technologies into the storage cluster via containerization technologies. 3rd party components running on the cluster nodes in the containers (e.g., docker, LinuX Containers ("LXC"), etc.) need to talk to the core components of the storage stack via some network and ICM may be an ideal candidate for this.

As discussed above, embodiments of network organization process 10 may be used to split the management network into the public management and ICM networks with corresponding changes to the storage stack design. A fully automatic configuration of the ICM network may be used without requiring information from the user. The ICM addressing architecture used herein does not require any semantical changes to the core components of the storage stack. Embodiments included herein provide for a simplified embedding of existing technologies into the storage cluster via containerization technologies as well as the ability to perform cluster-wide network reconfiguration of a storage cluster while some nodes are down or not in use.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for use in a clustered storage system comprising:
   providing, using a management network, one or more of external access to the clustered storage system, management of intra-cluster traffic, management of hypervisor traffic, and access to infrastructure services;
   allowing, using a storage network, access to the clustered storage system from within the clustered storage system and one or more external hosts;
   providing a migration network to allow for mobility of one or more virtual machines within clustered storage system; and
   splitting the management network into a public management network and an internal intra-cluster management network.

2. The computer-implemented method of claim 1 further comprising:
   automatically configuring the internal intra-cluster management network.

3. The computer-implemented method of claim 2 wherein automatically configuring is based upon, at least in part, one or more unique local addresses ("ULAs").

4. The computer-implemented method of claim 1 further comprising:
   if there is at least one failing node, allowing cluster-wide network reconfiguration of the clustered storage system.

5. The computer-implemented method of claim 4 further comprising:
   wherein cluster-wide network reconfiguration is performed while at least one node of the clustered storage system is down.

6. The computer-implemented method of claim 1 wherein the clustered storage system includes a hyper-converged infrastructure ("HCI") cluster.

7. The computer-implemented method of claim 3 wherein the one or more ULAs are used to eliminate storage stack component editing.

8. A computer program product residing on a computer readable medium having a plurality of instructions stored thereon which, when executed by a processor, cause the processor to perform operations comprising:
   providing, using a management network, one or more of external access to the clustered storage system, management of intra-cluster traffic, management of hypervisor traffic, and access to infrastructure services;
   allowing, using a storage network, access to the clustered storage system from within the clustered storage system and one or more external hosts;
   providing a migration network to allow for mobility of one or more virtual machines within clustered storage system; and
   splitting the management network into a public management network and an internal intra-cluster management network.

9. The computer-program product of claim 8 further comprising:
   automatically configuring the internal intra-cluster management network.

10. The computer-program product of claim 9 wherein automatically configuring is based upon, at least in part, one or more unique local addresses ("ULAs").

11. The computer-program product of claim 8 further comprising:
    if there is at least one failing node, allowing cluster-wide network reconfiguration of the clustered storage system.

12. The computer-program product of claim 11 further comprising:
    wherein cluster-wide network reconfiguration is performed while at least one node of the clustered storage system is down.

13. The computer-program product of claim 8 wherein the clustered storage system includes a hyper-converged infrastructure ("HCI") cluster.

14. The computer-program product of claim 10 wherein the one or more ULAs are used to eliminate storage stack component editing.

15. A computing system including a processor and memory configured to perform operations in a clustered storage system comprising:
    providing, using a management network, one or more of external access to the clustered storage system, management of intra-cluster traffic, management of hypervisor traffic, and access to infrastructure services;
    allowing, using a storage network, access to the clustered storage system from within the clustered storage system and one or more external hosts;
    providing a migration network to allow for mobility of one or more virtual machines within clustered storage system; and
    splitting the management network into a public management network and an internal intra-cluster management network.

16. The computing system of claim 15 further comprising:
    automatically configuring the internal intra-cluster management network.

17. The computing system of claim 16 wherein automatically configuring is based upon, at least in part, one or more unique local addresses ("ULAs").

18. The computing system of claim 15 further comprising:
    if there is at least one failing node, allowing cluster-wide network reconfiguration of the clustered storage system.

19. The computing system of claim 18 further comprising:
    wherein cluster-wide network reconfiguration is performed while at least one node of the clustered storage system is down.

20. The computing system of claim 15 wherein the clustered storage system includes a hyper-converged infrastructure ("HCI") cluster.

* * * * *